United States Patent [19]

Wheeler

[11] 4,021,849

[45] May 3, 1977

[54] TELEVISION RECEIVER RASTER BLANKING SYSTEM

[75] Inventor: Robert C. Wheeler, Elba, N.Y.

[73] Assignee: GTE Sylvania Incorporated, Stamford, Conn.

[22] Filed: May 26, 1976

[21] Appl. No.: 689,996

[52] U.S. Cl. .............................................. 358/165
[51] Int. Cl.² ........................................ H04N 3/24
[58] Field of Search ..................... 358/165; 315/384

[56] References Cited

UNITED STATES PATENTS

| 3,573,365 | 4/1971 | Anderson | 358/165 |
| 3,686,430 | 8/1972 | Parker | 358/165 |

Primary Examiner—John C. Martin
Assistant Examiner—Aristotelis M. Psitos
Attorney, Agent, or Firm—Norman J. O'Malley; Thomas H. Buffton; Robert T. Orner

[57] ABSTRACT

A cathode ray tube raster in a television receiver is blanked for selected channels chosen to receive audio information by a bias circuit coupled to a video signal source connected to a cathode ray tube wherein the bias circuit provides a given bias potential to the cathode ray tube when a modulated picture carrier signal is detected and a different bias potential blanking the raster of the cathode ray tube when an unmodulated picture carrier signal is detected.

9 Claims, 2 Drawing Figures

TELEVISION RECEIVER RASTER BLANKING SYSTEM

BACKGROUND OF THE INVENTION

In hospital and hotel-motel applications for television receivers, it is frequently desired to provide audio reception on one or more unused signal channels of a closed circuit system. Also, it is desirable to present a blanked raster or a blanked viewing screen for the channel selected to provide the audio reception. Thus, audio information, usually in the form of a radio transmission signal, is conveyed by an unused signal channel in a television receiver which also presents a blanked viewing screen to the observer.

In the prior art is has been customary to provide mechanical switch of the rotary type attached to the back of the signal channel tuner cluster of the television receiver. The switch included a positional location for each signal channel of the tuner and could be positionally adjusted to kill or render inoperative the scanning raster for any particular signal channel. More specifically, the switch usually opened the cathode circuit of the horizontal output tube for any particular programmed signal channel. In this manner, the selected signal channel provided audio reception which was not deleteriously affected by a scanning raster on the viewing screen of the television receiver.

Although the above-described apparatus has been and still is employed in numerous applications, it has been found that such systems do leave something to be desired. More specifically, it has been found that the above-mentioned mechanical switching apparatus is relatively expensive to provide. Also, the mechanical switch requires extensive electrical and mechanical alterations to a standard television receiver. Moreover, the mechanical-type switch undesirably requires programming for each signal channel whereat raster blanking is desired.

OBJECTS AND SUMMARY OF THE INVENTION

An object of the present invention is to provide an enhanced television receiver utilizing a signal channel for audio signal reception in a closed circuit system. Another object of the invention is to provide improved apparatus for effecting raster blanking of a television receiver for signal channels selected to provide audio reception. Still another object of the invention is to provide improved audio reception on selected channels of a television receiver at a reduced apparatus cost.

These and other objects, advantages and capabilities are achieved in one aspect of the invention by a raster blanking system for a television receiver wherein a bias circuit for a cathode ray tube provides one level of bias potential in response to a modulated picture carrier signal and a different level of bias potential in response to an unmodulated picture carrier signal whereby the raster of the cathode ray tube is blanked for unmodulated picture carrier signals and unblanked for modulated picture carrier signals.

DESCRIPTION OF THE PREFERRED EMBODIMENT

For a better understanding of the present invention, together with other and further objects, advantages and capabilities thereof, reference is made to the following disclosure and appended claims in conjunction with the accompanying drawings.

Figure 1:
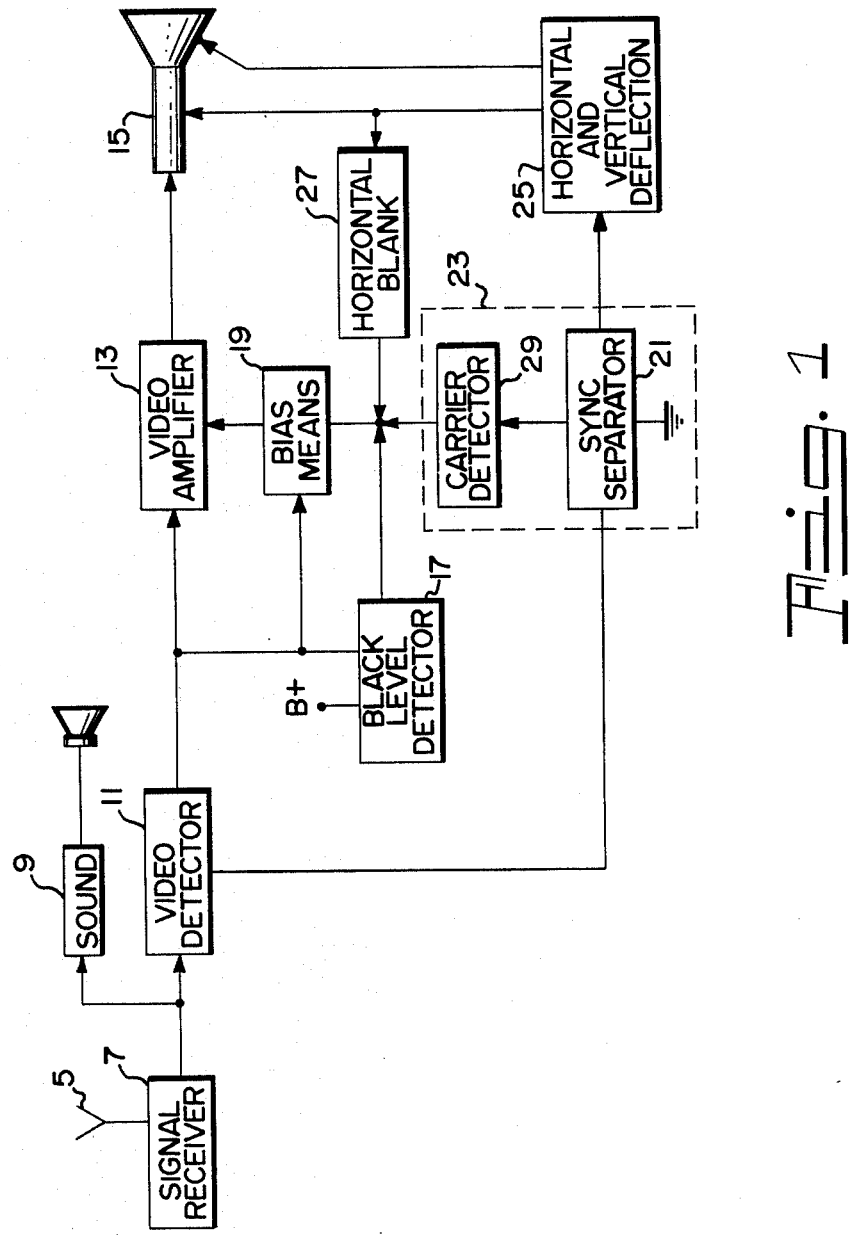
FIG. 1 is a diagram, in block form, of a television receiver utilizing a preferred embodiment of the invention.

Referring to FIG. 1 of the drawings, a television receiver includes an antenna 5 for intercepting and applying transmitted television signals to a signal receiver 7. The signal receiver 7 includes the usual RF and IF amplifier, detector, and mixer stages and provides an output signal which is coupled to a sound channel 9 and to video detector stage 11.

The video detector stage 11 detects the video modulation on a modulated picture carrier signal and applies the information via a video amplifier stage 13 to a cathode ray tube 15 to provide a visual image display. The information from the video detector stage 11 is also applied to a black level detector stage 17 is coupled to a potential source B and to the bias circuit means 19 which is, in turn coupled back to the video amplifier stage 13.

Another output from the video detector stage 11 is applied to a sync pulse separator stage 21 of a modulation presence detector means 23 wherein sync pulse signals are removed from the composite video signal and applied to a horizontal and vertical deflection and high voltage development circuit 25. The horizontal and vertical deflection and high voltage development circuit 25 provides deflection and high voltage potentials for the cathode ray tube 15 and also provides blanking pulses which are applied to a horizontal blanker stage 27.

An unmodulated carrier signal detector means 29 is coupled to the output of the sync pulse separator stage 21, to the black level detector stage 17, to the bias circuit means 19, and to the horizontal blanker stage 27. Thus, the unmodulated carrier signal detector means 29 is responsive to the output of the sync pulse separator stage 21 and horizontal blanker stage 27 for effecting control of the bias circuit means 19 as will be further explained hereinafter.

Figure 2:
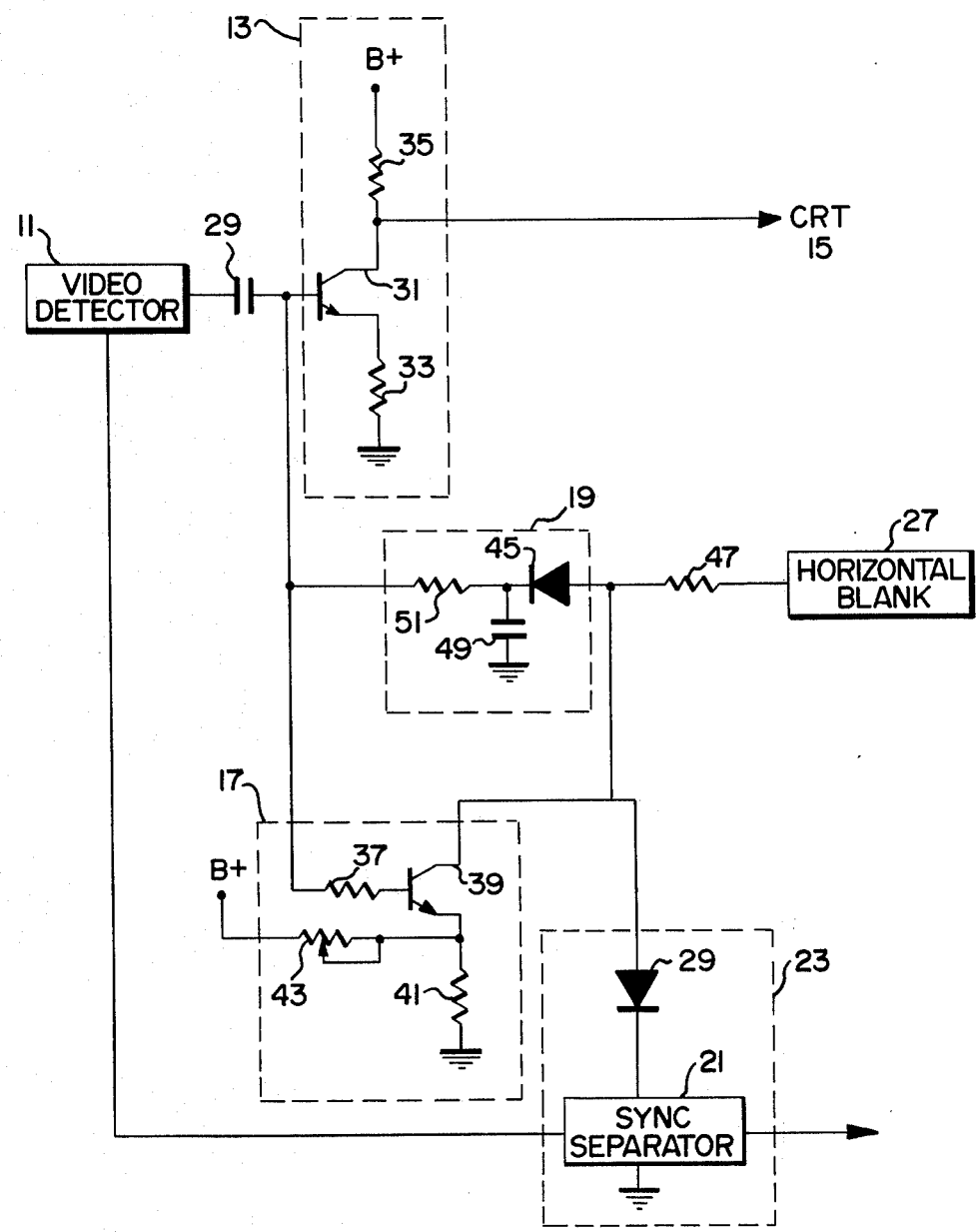
FIG. 2 is a diagram, in block and schematic form, illustrating the preferred embodiment of FIG. 1.

Referring to FIG. 2, the video detector stage 11 provides a video information siganl which is coupled via a coupling capacitor 29 to the base of a transistor 31 of the video amplifier stage 13. The emitter of the transistor 31 is connected via a resistor 33 to circuit ground while the collector is coupled to the cathode ray tube 15 and via a resistor 35 to the potential source B.

Also, the video information signal provided by the video detector stage 11 is coupled via the coupling capacitor 29 and a resistor 37 to the base of a transistor 39 of the black level detector stage 17. The emitter of the transistor 39 is connected to circuit ground by a resistor 41 and to a potential source B by way of a variable resistor 43 designated the "brightness" control. The collector of the transistor 39 is coupled to a diode 45 of the bias circuit means 19 and via a resistor 47 to the horizontal blanker stage 27. The diode 45 of the bias circuit means 19 is coupled to circuit ground by a capacitor 49 and by a resistor 51 to the junction of the coupling capacitor 29 and resistor 37.

Also connected to the collector of the transistor 39 of the black level detector stage 17, to the diode 45 of the bias circuit means 19, and to the horizontal blanker stage 27 is an unmodulated carrier signal detector means in the form of a diode 29. The unmodulated carrier signal detector means, or diode in this instance, 29 is also connected to the sync pulse separator stage 21 which has a coupling to circuit ground.

As to operation, it may be assumed that an ordinary modulated picture carrier signal is available from the video detector stage 11. Thereupon, a picture carrier signal representative of image information is applied to the amplifier stage 13 and then to the cathode ray tube 15 to provide an image display. The signal information available from the video detector stage 11 is also coupled to the bias circuit means 19. This signal information from the video detector stage 11 is also applied to the black level detector stage 17 which biases the video amplifier stage 13 through the bias circuit means 19 to a given black level setting which is varied in accordance with the selected positional location of the variable resistor or "brightness" control 43.

Further, sync pulse signals available in the modulated picture carrier signal are separated therefrom by the sync pulse separator stage 21 and applied to the unmodulated carrier signal detector means 29. In time sequence with and of a magnitude more positive than the sync pulse signals are the horizontal blanking pulses which are available from the horizontal blanker stage 27 and applied to the unmodulated carrier signal detector means 29. These horizontal blanking pulses prevent the sync pulse signals from rendering the unmodulated signal detector means 29 conductive and altering the level of the black level bias potential.

However, assume it is desired to provide audio reproduction by way of a preselected signal channel of the television receiver. Thereupon, an unmodulated carrier signal, which includes a picture carrier signal and a sound carrier signal wherefrom a detected sound carrier at about 4.5 MHz is derived, is applied to the antenna 7 of the television receiver. The video detector stage 11 receives and detects the unmodulated carrier signal which is applied to the sync pulse separator stage 21 to provide a relatively low DC potential output therefrom.

This low DC potential output from the sync pulse separator stage 21 causes conduction of the unmodulated carrier signal detector means 29. Thereupon, the conductivity of the unmodulated carrier signal detector means 29 causes a discharge of the bias circuit means 19 to circuit ground via the sync pulse separator stage 21. As a result, the black level is driven to a blacker than black condition and no raster appears on the cathode ray tube 15 for signal channels whereon an unmodulated carrier signal is applied. Also, audio reception is not deleteriously affected by the undesired appearance of a raster on the cathode ray tube 15 of the television receiver.

Thus, there has been provided a unique raster blanking system for a television receiver wherein raster blanking is effected in response to the application of an unmodulated carrier signal applied to a selected channel of the television receiver. The raster blanking system is automatic and relatively inexpensive to incorporate into any commercial television receiver. Moreover, the resultant raster blanking and audio signal reception are greatly enhanced as compared with other known techniques.

While there has been shown and described what is at present considered the preferred embodiment of the invention, it will be obvious to those skilled in the art that various changes and modifications may be made therein without departing from the invention as defind by the appended claims.

What is claimed is:

1. In a television receiver for providing audio information and raster blanking on selected signal channels wherein the receiver includes a cathode ray tube coupled to a video signal source and to a blanking pulse signal source, a raster blanking system comprising:
    bias circuit means coupled to said video signal source;
    black level clamping means coupled to said video signal source and to said bias circuit means;
    blanking pulse signal source means coupled to said cathode ray tube and to said bias circuit means; and
    modulation presence detector means coupled to said video signal source means, to said black level clamping means, to said blanking pulse signal source means and to said bias circuit means, said modulation presence detector means responding to a modulated signal from said video signal source means to cause said bias circuit means to remain substantially unaltered and to an unmodulated signal from said video signal source means to effect alternation of said bias circuit means and cause application of an increased bias potential and blanking of said raster of said cathode ray tube.

2. The raster blanking system of claim 1 wherein said modulation presence detector means is of a form which includes a sync pulse separator means coupled to an unmodulated carrier signal detector means.

3. The raster blanking system of claim 1 wherein said detecting means is in the form of a diode responsive to sync pulse signals for effecting non-conductivity and to a DC potential for effecting conductivity.

4. The raster blanking system of claim 1 wherein said detector means is responsive to the potential differential between a blanking pulse signal from said blanking pulse signal source and a DC potential from said sycn pulse separating means for effecting conductivity and a reduction in bias potential applied to said cathode ray tube for effecting raster blanking.

5. A raster blanking system for a television receiver having a cathode ray tube coupled to a video signal source and to a blanking pulse signal source, said raster blanking system comprising:
    bias circuit means coupled to said video signal source for effecting development and application of a bias potential to said cahtode ray tube; and
    detector means coupled to said bias circuit means, to said blanking pulse signal source, and to said video signal source, said detector means effecting non-conductivity causing application of a given level of bias potential to said cathode ray tube in response to a modulated signal from said video signal source and conductivity causing application of an altered level of bias potential to said cathode ray tube in response to an unmodulated video signal from said video signal source.

6. The raster blanking system of claim 5 including a sync pulse separating means coupling said video signal source to said detector means with said detector means rendered non-conductive in response to sync pulse signals from said sync pulse separating means an conductive in response to a DC potential from said sync pulse separating means.

7. The raster blanking system of claim 1 wherein said detecting means is of a form to detect the presence and absence of a picture carrier modulated signal at said video signal source means as compared with the presence and absence of a picture carrier modulated signal at said sync pulse separator means.

8. The raster blanking system of claim 5 wherein said detector means is in the form of a diode detector responsive to a modulated signal for effecting a bias potential providing a cathode ray tube raster and to an unmodulated signal for effecting a bias potential causing blanking of the cathode ray tube.

9. The raster blanking system of claim 5 including a black level dectector circuit means coupled to said video signal source, said bias circuit means, and said detector means whereby said black level detection is shifted in level in accordance with the necessary shift in bias potential applied to said cathode ray tube for effecting blanking of the raster of the cathode ray tube.

* * * * *

UNITED STATES PATENT AND TRADEMARK OFFICE
CERTIFICATE OF CORRECTION

PATENT NO. : 4,021,849
DATED : May 3, 1977
INVENTOR(S) : Robert C. Wheeler

It is certified that error appears in the above-identified patent and that said Letters Patent are hereby corrected as shown below:

Col. 2, line 21 - After "17" insert -- and to a bias circuit means 19. The black level detector stage 17

Col. 2, line 23 - Please delete "B" and insert -- B+ --.

Col. 2, line 51 - Please delete "B" and insert -- B+ --.

Col. 2, line 57 - Please delete "B" and insert -- B+ --.

Col. 4, line 64 - Please delete "an" and insert -- and --.

Signed and Sealed this ninth Day of August 1977

[SEAL]

Attest:

RUTH C. MASON
Attesting Officer

C. MARSHALL DANN
Commissioner of Patents and Trademarks